(12) United States Patent
Ning

(10) Patent No.: US 11,431,401 B2
(45) Date of Patent: Aug. 30, 2022

(54) TERMINAL DETECTION METHOD AND TERMINAL

(71) Applicant: VIVO MOBILE COMMUNICATION CO., LTD., Guangdong (CN)

(72) Inventor: Haibo Ning, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 12 days.

(21) Appl. No.: 17/068,564

(22) Filed: Oct. 12, 2020

(65) Prior Publication Data
US 2021/0028851 A1 Jan. 28, 2021

Related U.S. Application Data

(63) Continuation of application No. PCT/CN2019/081923, filed on Apr. 9, 2019.

(30) Foreign Application Priority Data

Apr. 12, 2018 (CN) .......................... 201810324292.2

(51) Int. Cl.
*H04W 36/32* (2009.01)
*H04B 7/08* (2006.01)
(Continued)

(52) U.S. Cl.
CPC ............ *H04B 7/086* (2013.01); *H04W 4/029* (2018.02); *H04W 36/32* (2013.01); *H04W 64/006* (2013.01)

(58) Field of Classification Search
CPC ...... H04B 7/086; H04B 17/382; H04B 17/27; H04W 4/029; H04W 36/32; H04W 64/006; H04W 4/02; H04W 24/02; H04W 4/026
See application file for complete search history.

(56) References Cited

U.S. PATENT DOCUMENTS

2006/0239238 A1* 10/2006 Fernandez-Corbaton .................. H04W 52/325
370/342
2007/0197229 A1 8/2007 Kalliola et al.
(Continued)

FOREIGN PATENT DOCUMENTS

CN 101385382 A 3/2009
CN 101977068 A 2/2011
(Continued)

OTHER PUBLICATIONS

EP Search Report in Application No. 19786025.7 dated Apr. 29, 2021.
(Continued)

*Primary Examiner* — German Viana Di Prisco
(74) *Attorney, Agent, or Firm* — Maschoff Brennan

(57) ABSTRACT

A terminal detection method obtaining current first position information of a terminal, where the first position information indicates that a position where the terminal is currently located is a first position and, when the first position information does not match second position information stored in the terminal, obtaining a first direction vector between a target base station and the terminal, where the target base station is to be accessed by the terminal. A current first normal vector of an antenna array plane of the terminal is obtained. A first target vector according to the first direction vector and the first normal vector is determined. The first target vector instructs the terminal to search for a signal transmitted by the target base station in a direction of the first target vector. The method and related terminal may be applied to the process of the terminal accessing the target base station.

14 Claims, 4 Drawing Sheets

(51) Int. Cl.
*H04W 4/029* (2018.01)
*H04W 64/00* (2009.01)

(56) References Cited

U.S. PATENT DOCUMENTS

| | | |
|---|---|---|
| 2010/0007573 A1* | 1/2010 | Kuramoto ............ H01Q 25/005 |
| | | 343/843 |
| 2010/0069070 A1 | 3/2010 | Shi et al. |
| 2012/0320874 A1 | 12/2012 | Li et al. |
| 2014/0223496 A1 | 8/2014 | Sasaki et al. |
| 2015/0189619 A1 | 7/2015 | Kalliola et al. |
| 2015/0208353 A1* | 7/2015 | Jung ................ H04W 52/0254 |
| | | 455/456.6 |
| 2016/0258761 A1 | 9/2016 | Jovicic et al. |
| 2020/0287618 A1* | 9/2020 | Kanemoto ............ H04W 48/08 |
| 2021/0028851 A1 | 1/2021 | Ning |

FOREIGN PATENT DOCUMENTS

| | | |
|---|---|---|
| CN | 103947218 A | 7/2014 |
| CN | 105682035 A | 6/2016 |
| CN | 107407566 A | 11/2017 |
| CN | 108769893 A | 11/2018 |

OTHER PUBLICATIONS

Written Opinion and International Search Report in Application No. PCT/CN2019/081923 dated Oct. 13, 2020.

* cited by examiner

TERMINAL DETECTION METHOD AND TERMINAL

CROSS-REFERENCE TO RELATED APPLICATION

This application is a continuation application of International Application No. PCT/CN2019/081923 filed on Apr. 9, 2019, which claims the benefit and priority of Chinese Application No. 201810324292.2 entitled "TERMINAL DETECTION METHOD AND TERMINAL", filed on Apr. 12, 2018, which is incorporated herein by reference in its entirety.

TECHNICAL FIELD

The present disclosure relates to the field of terminal technologies, and in particular to a terminal detection method and a terminal.

BACKGROUND

In the field of communications technology, electromagnetic waves with a frequency of 24 GHz to 100 GHz are usually referred to as millimeter waves. Generally, the higher the frequency of the electromagnetic wave, the greater the space loss.

In order to compensate for space loss of millimeter waves, a multi-antenna beamforming technique is introduced, which concentrates energy of millimeter-wave signals transmitted by a millimeter-wave base station in a certain direction in a space of by beamforming, thereby reducing loss of the energy of millimeter-wave signals in other directions in the space. When a terminal needs to access the millimeter-wave base station, the terminal may detect the millimeter-wave signals transmitted by the millimeter-wave base station in various directions one by one in the space where the terminal is located, until the millimeter-wave signal is detected in a certain direction.

However, in the above method, when the terminal accesses the millimeter-wave base station, the terminal needs to first traverse multiple directions to detect the millimeter-wave signals; until the millimeter-wave signal is detected, the terminal can access the millimeter-wave base station that transmits the millimeter-wave signals. Thus, the procedure for the terminal to access the millimeter-wave base station is time-consuming and is inefficient.

SUMMARY

Embodiments of the present disclosure provide a terminal detection method and a terminal, which can solve problems that the procedure for a terminal to access a millimeter-wave base station is time-consuming and is inefficient.

In order to solve the above technical problems, the present disclosure adopts the following technical solutions.

A first aspect of the present disclosure provides a terminal detection method, including: obtaining current first position information of a terminal; wherein the first position information is configured to indicate that a position where the terminal is currently located is a first position; when the first position information does not match second position information stored in the terminal, obtaining a first direction vector; wherein the first direction vector is a direction vector between a target base station and the terminal, and the target base station is a base station to be accessed by the terminal; obtaining a current first normal vector of an antenna array plane of the terminal; determining a first target vector according to the first direction vector and the first normal vector; wherein the first target vector is configured to instruct the terminal to search for a signal transmitted by the target base station in a direction of the first target vector.

A second aspect of the present disclosure provides a terminal, including: an obtaining unit configured to obtain current first position information of the terminal, wherein the first position information is configured to indicate that a position where the terminal is currently located is a first position; wherein the obtaining unit is further configured to, when the first position information does not match second position information stored in the terminal, obtain a first direction vector, wherein the first direction vector is a direction vector between a target base station and the terminal, and the target base station is a base station to be accessed by the terminal; wherein the obtaining unit is further configured to obtain a current first normal vector of an antenna array plane of the terminal; a determining unit configured to determine a first target vector according to the first direction vector and the first normal vector obtained by the obtaining unit, wherein the first target vector is configured to instruct the terminal to search for a signal transmitted by the target base station in a direction of the first target vector.

A third aspect of the present disclosure provides a terminal, including: a processor, a memory, and a computer program stored on the memory and operable on the processor; wherein the computer program is executed by the processor to implement steps of the terminal detection method according to the first aspect.

A fourth aspect of the present disclosure provides a computer-readable storage medium, where the computer-readable storage medium stores a computer program. When the computer program is executed by a processor to implement steps of the terminal detection method according to the first aspect.

In the present disclosure, when the current first position information of the terminal does not match the second position information stored in the terminal, the terminal may determine the first target vector according to the obtained first direction vector and the first normal vector. Since the terminal can determine the first target vector according to the first direction vector and the first normal vector and the first target vector is configured to instruct the terminal to search for the signal transmitted by the target base station in the direction of the first target vector, then, when the terminal accesses the target base station, the terminal does not need to traverse multiple directions in the space where the terminal is located to search for the signal transmitted by the target base station. Instead, the terminal only needs to search for the signal transmitted by the target base station in the direction of the first target vector instructed by the first target vector, which shortens the time for the terminal to search for signals transmitted by the target base station in multiple directions, thereby saving time of process in which the terminal accesses the target base station and then improving the efficiency of the terminal accessing the target base station.

BRIEF DESCRIPTION OF THE DRAWINGS

In order to more clearly illustrate the technical solutions of the present disclosure, the drawings used in the present disclosure will be briefly described hereinafter. A person of ordinary skill in the art may still derive other drawings from these accompanying drawings without creative efforts.

DETAILED DESCRIPTION

The technical solutions in embodiments of the present disclosure will be described hereinafter in a clear manner in conjunction with the drawings in the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

The terms such as "first" and "second" used in the specification and claims are used to differentiate similar objects rather than to represent a specific order of the objects. For example, first position information and second position information and the like are used to distinguish different location information, rather than to represent a specific order of location information. In the description of the present disclosure, the meaning of "a plurality" means two or more unless otherwise stated.

The term "and/or" in this context describes an association relationship of associated objects, indicating that there may be three relationships, for example, A and/or B, means that there are three cases of including a single A, including a single B, and including both A and B.

In the present disclosure, the terms "exemplary" or "for example" are used as examples, instances or illustrations. Any embodiment or design scheme described in the present disclosure as "exemplary" or "for example" should not be construed as being more preferred or advantageous than other embodiments or design scheme. Specifically, the terms such as "exemplary" or "for example" are intended to present concepts in a specific way.

One embodiment of the present disclosure provides a terminal detection method and a terminal, which may be applied to a process in which a terminal accesses a target base station. Specifically, it can be applied to a process in which the terminal searches for a signal transmitted by the target base station in a direction of a determined first target vector, and accesses the target base station. The terminal detection method and the terminal provided in the embodiments of the present disclosure can solve the problem in the related art that the procedure for the terminal to access the millimeter-wave base station is time-consuming and is inefficient.

The terminal in one embodiment of the present disclosure may be a terminal having an operating system. The operating system may be an Android (Android) operating system, or may be an iOS operating system, or may also be other possible operating systems, which are not specifically limited in this embodiment.

In the following, the Android operating system is taken as an example to illustrate a software environment applied by the terminal detection method provided in the embodiment of the present disclosure.

Figure 1:
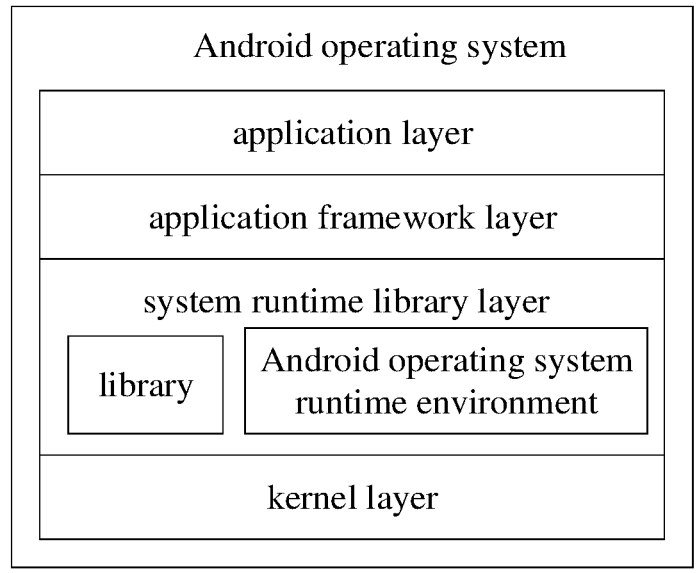
FIG. 1 is a schematic architecture diagram of an Android operating system according to an embodiment of the present disclosure.

FIG. 1 is a schematic architecture diagram of a possible Android operating system according to an embodiment of the present disclosure. As shown in FIG. 1, the architecture of the Android operating system includes four layers, namely: an application layer, an application framework layer, a system runtime library layer, and a kernel layer (which may be, specifically, a Linux kernel layer).

The application layer includes various applications (including system applications and third-party applications) in the Android operating system.

The application framework layer is a framework of the applications, and developers can develop some applications based on the application framework layer, while complying with development principles of the framework of the applications.

The system runtime library layer includes libraries (also known as system libraries) and Android operating system runtime environment. The library mainly provides various resources required by the Android operating system. The Android operating system runtime environment is used to provide a software environment for the Android operating system.

The kernel layer is an operating system layer of the Android operating system and belongs to a bottom layer of the Android operating system software. The kernel layer provides core system services and hardware related drivers for the Android operating system based on a Linux kernel.

Taking the Android operating system as an example, in one embodiment of the present disclosure, developers can develop software programs that implement the terminal detection method provided in the embodiments of the present disclosure based on the system architecture of the Android operating system as shown in FIG. 1, so that the terminal detection method can run based on the Android operating system as shown in FIG. 1. That is, a processor or the terminal can implement the terminal detection method provided in the embodiment of the present disclosure by running the software program in the Android operating system.

Figure 2:
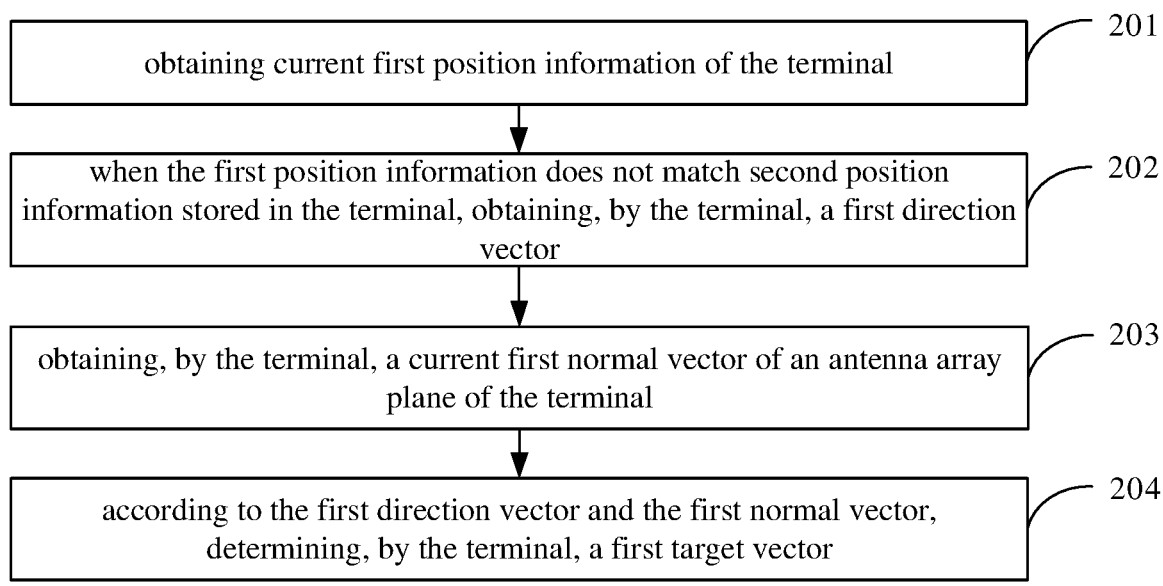
FIG. 2 is a first flow chart of a terminal detection method according to an embodiment of the present disclosure.

In a first embodiment of the present disclosure, a method for obtaining a first target vector by a terminal when first position information does not match second position information is specifically described. Specifically, FIG. 2 shows a terminal detection method provided in an embodiment of the present disclosure and this method may be operable by a terminal having the Android operating system as shown in FIG. 1. As shown in FIG. 2, the terminal detection method includes steps 201-204.

Step 201: obtaining, by the terminal, current first position information of the terminal.

In the embodiment of the present disclosure, the first position information is configured to indicate that a position where the terminal is currently located is a first position.

Optionally, in the embodiment of the disclosure, the terminal may obtain the current first position information of the terminal through satellite positioning, sensor-assisted positioning, Bluetooth positioning, wireless-fidelity (Wireless-Fidelity, WiFi) positioning, or mobile network positioning, etc.

Optionally, in the embodiment of the disclosure, the first position may be first latitude and longitude at which the terminal is currently located.

Step 202: when the first position information does not match second position information stored in the terminal, obtaining, by the terminal, a first direction vector.

In the embodiment of the present disclosure, the first direction vector is a direction vector between a target base station and the terminal. The target base station is a base station to be accessed by the terminal.

In the embodiment of the present disclosure, after the terminal obtains the first position information, the terminal may compare the first position information with the second position information stored in the terminal, to determine whether the first position information match the second position information.

In the embodiment of the present disclosure, when the current first position information of the terminal does not match the second position information stored in the terminal, it indicates that the terminal does not access the target base station at the first position, and then the terminal may obtain a direction vector between the target base station and the terminal.

Optionally, in the embodiment of the present disclosure, the terminal may calculate a difference between the first position indicated by the first position information and the second position indicated by the second position information, and determine whether the difference is outside of a preset range, to determine whether the first position information matches the second position information.

Optionally, in the embodiment of the present disclosure, the terminal may obtain in advance third position information of the target base station. The third position information is configured to indicate a third position where the target base station is currently located. Then, the first direction vector is determined according to the third position information and the first position information.

Optionally, in the embodiment of the disclosure, the third position may be second latitude and longitude where the target base station is currently located.

Optionally, in the embodiment of the disclosure, the terminal may perform data interaction with the target base station through a mobile network or a wireless local area network (for example, the terminal transmits a position request message to the target base station), to obtain the third position information.

For example, the terminal obtains in advance the second latitude and longitude where the target base station is located. Then, the terminal maps the first latitude and longitude and the second latitude and longitude to a preset geographic coordinate system in the terminal, respectively, and determines a line between the two points mapped to the geographic coordinate system as the first direction vector.

Figure 3:
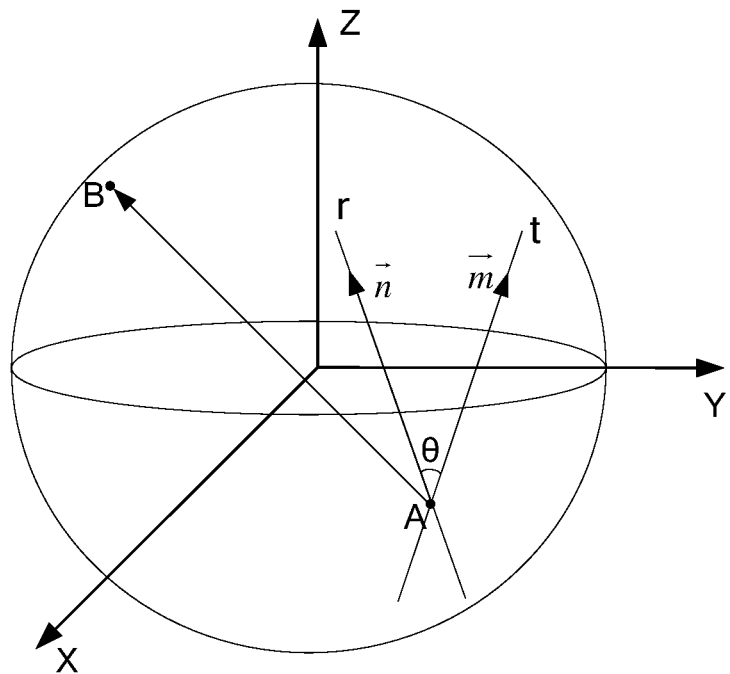
FIG. 3 is a schematic diagram of an example of a relationship between a rotation angle and a first normal vector according to an embodiment of the present disclosure.

For example, as shown in FIG. 3, the terminal maps the first latitude and longitude and the second latitude and longitude to the preset geographic coordinate system in the terminal, respectively, which are respectively points A and B in FIG. 3. The terminal determines a line between the points A and B as the first direction vector, that is, the first direction vector is a vector $\overrightarrow{AB}$.

Optionally, in the embodiment of the disclosure, the target base station may be a millimeter-wave base station. The millimeter-wave base station is a base station that transmits millimeter-wave signals. The millimeter-wave signals transmitted by the millimeter-wave base station have a frequency of 24 GHz to 100 GHz.

Step 203: obtaining, by the terminal, a current first normal vector of an antenna array plane of the terminal.

Figure 4:
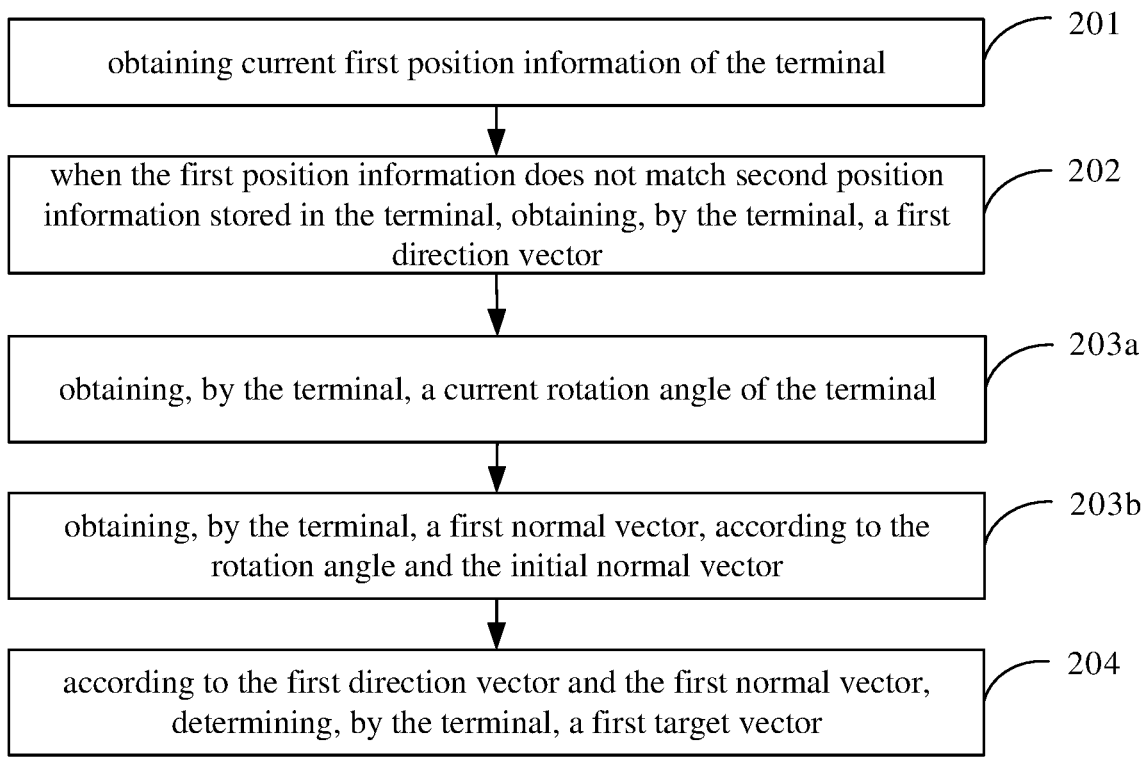
FIG. 4 is a second flow chart of a terminal detection method according to an embodiment of the present disclosure.

Optionally, in the embodiment of the present disclosure, in conjunction with FIG. 2, as shown in FIG. 4, the foregoing step 203 may be specifically implemented by steps 203a and 203b.

Step 203a: obtaining, by the terminal, a current rotation angle of the terminal.

In the embodiment of the present disclosure, the rotation angle is an angle at which an axis of the terminal rotates relative to an initial normal vector of the antenna array plane of the terminal, where before the axis is rotated, a direction of the axis is the same as a direction of the initial normal vector.

Optionally, in the embodiment of the present disclosure, the terminal may measure the current rotation angle of the terminal through a sensor (i.e., a gyroscope, a gravity accelerometer, a compass, etc.) of the terminal.

For example, as shown in FIG. 3, the first position where the terminal is located is the first latitude and longitude, and is projected to a geographic coordinate system as a point A. An initial normal vector of the antenna array plane of the terminal is a vector $\overrightarrow{n}$. An axis of the terminal is r. A direction of the axis r is the same as the direction of the vector $\overrightarrow{n}$. After the axis r of the terminal rotates relative to the vector $\underline{n}$, then the axis is an axis t. The terminal measures an angle between the axis r and the axis t through the sensor, thereby obtaining a rotation angle θ.

Step 203b: obtaining, by the terminal, a first normal vector, according to the rotation angle and the initial normal vector.

For example, as shown in FIG. 3, a current first normal vector of the antenna array plane of the terminal, obtained by the terminal according to the rotation angle θ and the initial normal vector $\overrightarrow{n}$, is a vector $\overrightarrow{m}$.

Step 204: according to the first direction vector and the first normal vector, determining, by the terminal, a first target vector.

In the embodiment of the present disclosure, the first target vector is configured to instruct the terminal to search for a signal transmitted by the target base station in a direction of the first target vector.

In the embodiment of the present disclosure, the first target vector is an offset vector of the first direction vector relative to the first normal vector.

Optionally, in the embodiment of the disclosure, the foregoing step 204 may be specifically implemented by step 204a.

Step 204a: calculating, by the terminal, a difference between the first direction vector and the first normal vector to obtain the first target vector.

For example, the terminal calculates a difference between the first direction vector $\overrightarrow{AB}$ and the first normal vector $\overrightarrow{m}$ to obtain a first target vector $\overrightarrow{s}=\overrightarrow{AB}-\overrightarrow{m}$.

According to the terminal detection method provided in the embodiment of the present disclosure, when the current first position information of the terminal does not match the second position information stored in the terminal, the terminal may determine the first target vector according to the obtained first direction vector and the first normal vector. Since the terminal can determine the first target vector according to the first direction vector and the first normal vector and the first target vector is configured to instruct the terminal to search for the signal transmitted by the target base station in the direction of the first target vector, then, when the terminal accesses the target base station, the terminal does not need to traverse multiple directions in the space where the terminal is located to search for the signal transmitted by the target base station. Instead, the terminal only needs to search for the signal transmitted by the target base station in the direction of the first target vector instructed by the first target vector, which shortens the time for the terminal to search for signals transmitted by the target base station in multiple directions, thereby saving time of process in which the terminal accesses the target base station and then improving the efficiency of the terminal accessing the target base station.

Optionally, in the embodiment of the present disclosure, after the foregoing step 204, the terminal detection method provided in the embodiment of the present disclosure further includes step 501.

Step 501: adjusting, by the terminal, a beam direction of the antenna array of the terminal to be the same as a direction of the first target vector.

Optionally, in the embodiment of the present disclosure, after determining the first target vector, the terminal may change the beam direction of the antenna array of the terminal to be the same as the direction of the first target vector, by adjusting gains of amplifiers in multiple paths of the terminal's antenna array and phases of multiple phase modulators.

After the terminal determines the first target vector, the terminal can adjust the beam direction of the antenna array of the terminal to be the same as the direction of the first target vector, thereby realizing alignment of a beam transmitting direction of the target base station and a beam receiving direction of the terminal, and then facilitating the terminal to search for signals transmitted by the target base station in the direction of the first target vector.

Optionally, in the embodiment of the present disclosure, after the foregoing step 501, the terminal detection method provided in the embodiment of the present disclosure further includes steps 601 and 602.

Step 601: searching, by the terminal, for a signal transmitted by the target base station in the direction of the first target vector.

In the embodiment of the present disclosure, after the terminal adjusts the beam direction of the antenna array of the terminal to be the same as the direction of the first target vector, the terminal scans and searches for the signal transmitted by the target base station in the direction of the first target vector.

Step 602: when the terminal has searched the signal transmitted by the target base station, transmitting a request message for establishing connection to the target base station.

In the embodiment of the present disclosure, in case that the terminal has searched the signal transmitted by the target base station in the direction of the first target vector, the terminal may transmit a request message for establishing connection to the target base station to achieve fast access to the target base station.

It should be noted that, in the embodiment of the present disclosure, in case that the terminal does not search the signal transmitted by the target base station in the direction of the first target vector, the step 202 to the step 204 in FIG. 2 may be repeatedly performed to re-determine the first target vector.

Figure 5:
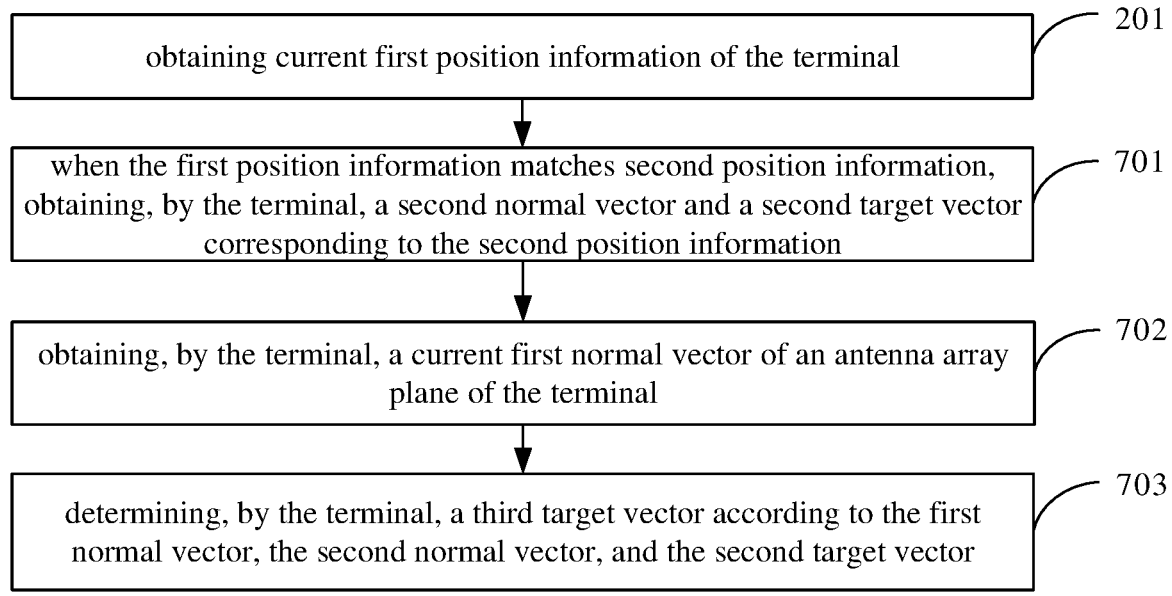
FIG. 5 is a third flow chart of a terminal detection method according to an embodiment of the present disclosure.

In a second embodiment of the present disclosure, a method for obtaining a third target vector by a terminal when first position information matches second position information is specifically described. Specifically, FIG. 5 shows another terminal detection method provided in an embodiment of the present disclosure and this method may be operable by a terminal having the Android operating system as shown in FIG. 1. As shown in FIG. 5, the terminal detection method includes the step 201 and steps 701-703.

Step 201: obtaining, by the terminal, current first position information of the terminal.

In the embodiment of the present disclosure, the first position information is configured to indicate that a position where the terminal is currently located is a first position.

Step 701: when the first position information matches second position information, obtaining, by the terminal, a second normal vector and a second target vector corresponding to the second position information.

Optionally, in the embodiment of the present disclosure, the terminal may calculate a difference between the first position indicated by the first position information and a second position indicated by the second position information, and determine whether the difference is within a preset range to determine whether the first position information matches the second position information.

In the embodiment of the present disclosure, when the current first position information of the terminal matches the second position information stored in the terminal, it indicates that the terminal has accessed the target base station at the second position, and the terminal may search, in the terminal, for the second normal vector and the second target vector corresponding to the second position information.

Optionally, in the embodiment of the present disclosure, before the step 701, the terminal detection method provided in the embodiment of the present disclosure further includes step 801.

Step 801: storing, by the terminal, the second position information, the second normal vector and the second target vector in the terminal.

Optionally, in the embodiment of the present disclosure, the terminal may store correspondence among the second position information, the second normal vector and the second target vector with a list. That is, the second position information uniquely corresponds to one second normal vector and one second target vector.

In the embodiment of the present disclosure, the second target vector is configured to instruct the terminal to search for the signal transmitted by the target base station in the direction of the second target vector.

Step 702: obtaining, by the terminal, a current first normal vector of an antenna array plane of the terminal.

In the embodiment of the present disclosure, the first normal vector obtained by the terminal when performing the step 702 may be the same as or different from the first normal vector obtained by the terminal when performing the step 203, and the specific situation is determined based on a current rotation angle of the terminal.

It should be noted that, in the embodiment of the present disclosure, in the foregoing step 702, the method for the terminal to obtain the first normal vector may refer to the specific description of the step 203 in the foregoing embodiment, and details are not described herein again.

Step 703: determining, by the terminal, a third target vector according to the first normal vector, the second normal vector, and the second target vector.

In the embodiment of the present disclosure, the third target vector is configured to instruct the terminal to search for signals transmitted by the target base station in the direction of the third target vector.

Optionally, in the embodiment of the present disclosure, the foregoing step 703 may be specifically implemented by steps 703a and 703b.

Step 703a: calculating, by the terminal, a difference between the first normal vector and the second normal vector to obtain a first vector.

In the embodiment of the present disclosure, the terminal may obtain the first vector by calculating the difference between the first normal vector and the second normal vector in the step 702. The first vector may reflect a change between the first normal vector when the terminal is in the first position and the second normal vector when the terminal is in the second position, i.e., a change between a rotation angle when the terminal is in the first position and a rotation angle when the terminal is in the second position.

Step 703b: calculating, by the terminal, a sum of the first vector and the second target vector to obtain the third target vector.

When the first position information matches the second position information, the terminal may determine the third target vector according to the first normal vector, the second normal vector and the second target vector, and the third target vector is configured to instruct the terminal to search for signals transmitted by the target base station in the direction of the third target vector. Thus, when the terminal accesses the target base station, the terminal does not need to traverse multiple directions in the space where the terminal is located to search for the signal transmitted by the target base station. Instead, the terminal only needs to search for the signal transmitted by the target base station in the direction of the third target vector instructed by the third target vector, which shortens the time for the terminal to search for signals transmitted by the target base station in multiple directions, thereby saving time of process in which the terminal accesses the target base station and then improving the efficiency of the terminal accessing the target base station.

Optionally, in the embodiment of the present disclosure, after the foregoing step 703, the terminal detection method provided in the embodiment of the present disclosure further includes step 901.

Step 901: adjusting, by the terminal, a beam direction of the antenna array of the terminal to be the same as a direction of the third target vector.

Optionally, in the embodiment of the present disclosure, after the terminal determines the third target vector, the terminal may change the beam direction of the antenna array of the terminal to be the same as the direction of the third target vector, by adjusting gains of amplifiers in multiple paths of the terminal's antenna array and phases of multiple phase modulators.

After the terminal determines the third target vector, the terminal can adjust the beam direction of the antenna array of the terminal to be the same as the direction of the third target vector, thereby realizing alignment of a beam transmitting direction of the target base station and a beam receiving direction of the terminal, and then facilitating the terminal to search for signals transmitted by the target base station in the direction of the third target vector.

Optionally, in the embodiment of the present disclosure, after the foregoing step 901, the terminal detection method provided in the embodiment of the present disclosure further includes steps 1001 and 1002.

Step 1001: searching, by the terminal, for a signal transmitted by the target base station in the direction of the third target vector.

Step 1002: when the terminal has searched the signal transmitted by the target base station, transmitting a request message for establishing connection to the target base station.

In the embodiment of the present disclosure, in case that the terminal has searched the signal transmitted by the target base station in the direction of the third target vector, the terminal may transmit a request message for establishing connection to the target base station to achieve fast access to the target base station.

It should be noted that, in the embodiment of the present disclosure, in case that the terminal does not search the signal transmitted by the target base station in the direction of the third target vector, the step 701 to the step 703 in FIG. 5 may be repeatedly performed to re-determine the third target vector.

Figure 6:
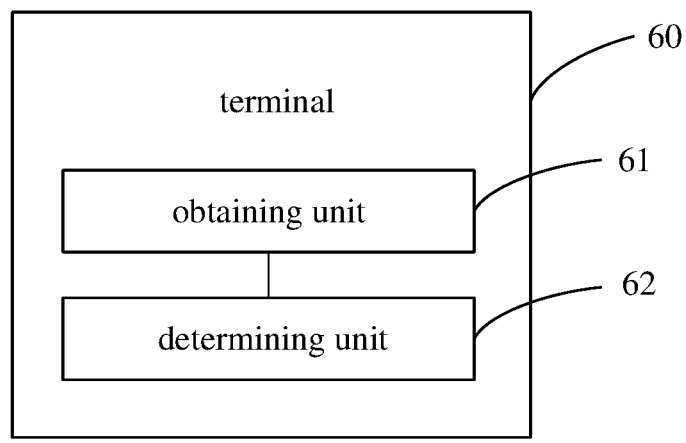
FIG. 6 is a first schematic structural diagram of a terminal according to an embodiment of the present disclosure.

In a third embodiment of the present disclosure, FIG. 6 is a schematic structural diagram of a terminal involved in the embodiment of the present disclosure. As shown in FIG. 6, a terminal 60 may include: an obtaining unit 61 and a determining unit 62.

The obtaining unit 61 is configured to obtain current first position information of the terminal 60. The first position information is configured to indicate that a position where the terminal 60 is currently located is a first position. The obtaining unit 61 is further configured to, when the first position information does not match second position information stored in the terminal 60, obtain a first direction vector. The first direction vector is a direction vector between a target base station and the terminal 60. The target base station is a base station to be accessed by the terminal 60. The obtaining unit 61 is further configured to obtain a current first normal vector of an antenna array plane of the terminal 60. The determining unit 62 is configured to, according to the first direction vector and the first normal vector obtained by the obtaining unit 61, determine a first target vector. The first target vector is configured to instruct the terminal 60 to search for a signal transmitted by the target base station in a direction of the first target vector.

In a possible implementation, the obtaining unit 61 is further configured to, when the first position information matches the second position information, obtain a second normal vector and a second target vector corresponding to the second position information. The obtaining unit 61 is further configured to obtain a current first normal vector of an antenna array plane of the terminal. The determining unit 62 is further configured to determine a third target vector according to the first normal vector, the second normal vector, and the second target vector obtained by the obtaining unit 61. The third target vector is configured to instruct the terminal 60 to search for signals transmitted by the target base station in the direction of the third target vector.

In a possible implementation, the obtaining unit 61 is specifically configured to: obtain a current rotation angle of the terminal 60, where the rotation angle is an angle at which an axis of the terminal 60 rotates relative to an initial normal vector of the antenna array plane of the terminal 60, where before the axis is rotated, a direction of the axis is the same as a direction of the initial normal vector; and obtain a first normal vector according to the rotation angle and the initial normal vector.

In a possible implementation, the determining unit 62 is specifically configured to calculate a difference between the first direction vector and the first normal vector to obtain the first target vector.

In a possible implementation, the determining unit 62 is specifically configured to: calculate a difference between the first normal vector and the second normal vector to obtain a first vector; and calculate a sum of the first vector and the second target vector to obtain the third target vector.

Figure 7:
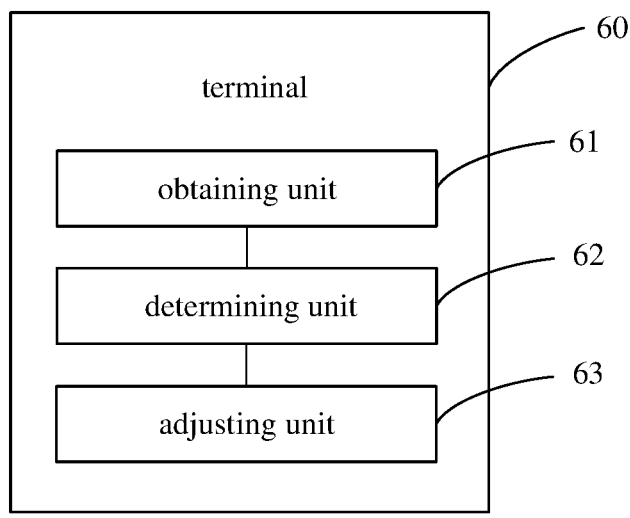
FIG. 7 is a second schematic structural diagram of a terminal according to an embodiment of the present disclosure.

In a possible implementation manner, as shown in FIG. 7, the terminal 60 in FIG. 6 further includes an adjusting unit 63. The adjusting unit is configured to, after the determining unit 62 determines the first target vector according to the first direction vector and the first normal vector, adjust a beam direction of the antenna array of the terminal 60 to be the same as a direction of the first target vector determined by the determining unit 62.

In a possible implementation manner, the terminal 60 in the embodiment of the present disclosure further includes a search unit and a transmission unit. The search unit is configured to, after the adjusting unit 63 adjusts the beam direction of the antenna array of the terminal 60 to be the same as the direction of the first target vector, search for a signal transmitted by the target base station in the direction of the first target vector. The transmission unit is configured to, when the search unit has searched the signal, transmit a request message for establishing connection to the target base station.

The terminal 60 provided in the embodiment of the present disclosure can implement various procedures implemented by the terminal in the foregoing method embodiments. To avoid repetition, detailed descriptions are not described herein again.

According to the terminal provided in the embodiment of the present disclosure, when the current first position information of the terminal does not match the second position information stored in the terminal, the terminal may determine the first target vector according to the obtained first direction vector and the first normal vector. Since the terminal can determine the first target vector according to the first direction vector and the first normal vector and the first target vector is configured to instruct the terminal to search for the signal transmitted by the target base station in the direction of the first target vector, then, when the terminal accesses the target base station, the terminal does not need to traverse multiple directions in the space where the terminal is located to search for the signal transmitted by the target base station. Instead, the terminal only needs to search for the signal transmitted by the target base station in the direction of the first target vector instructed by the first target vector, which shortens the time for the terminal to search for signals transmitted by the target base station in multiple directions, thereby saving time of process in which the terminal accesses the target base station and then improving the efficiency of the terminal accessing the target base station.

Figure 8:
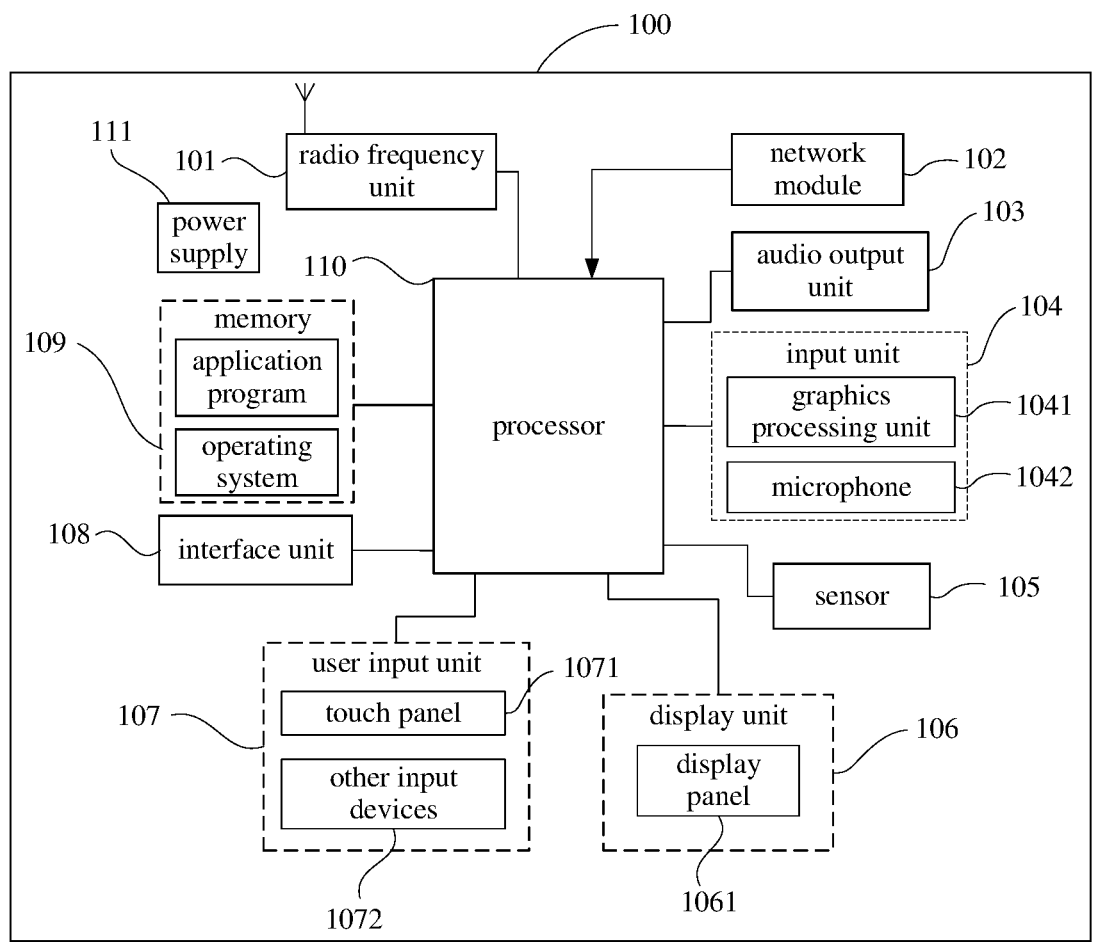
FIG. 8 is a schematic structural diagram of hardware structure of a terminal according to an embodiment of the present disclosure.

In a fourth embodiment of the present disclosure, FIG. 8 is a schematic diagram of a hardware structure of a terminal that implements various embodiments of the present disclosure. As shown in FIG. 8, a terminal 100 includes, but is not limited to, a radio frequency unit 101, a network module 102, an audio output unit 103, an input unit 104, a sensor 105, a display unit 106, a user input unit 107, an interface unit 108, a memory 109, a processor 110, and a power supply 111.

A person skilled in the art may understand that the terminal is not limited to the structure of the terminal shown in FIG. 8. The terminal may include more or fewer parts than that shown in the figure, or some parts may be combined, or an arrangement of parts may be different. In this embodiment of this application, the terminal includes but is not limited to a mobile phone, a tablet computer, a notebook computer, a palmtop computer, an in-vehicle terminal, a wearable device, a pedometer, and the like.

The processor 110 may be configured to obtain current first position information of the terminal, where the first position information is configured to indicate that a position where the terminal is currently located is a first position; when the first position information does not match second position information stored in the terminal, obtain a first direction vector, where the first direction vector is a direction vector between a target base station and the terminal and the target base station is a base station to be accessed by the terminal; obtain a current first normal vector of an antenna array plane of the terminal; according to the first direction vector and the first normal vector, determine a first target vector, where the first target vector is configured to instruct the terminal to search for a signal transmitted by the target base station in a direction of the first target vector.

According to the terminal provided in the embodiment of the present disclosure, when the current first position information of the terminal does not match the second position information stored in the terminal, the terminal may determine the first target vector according to the obtained first direction vector and the first normal vector. Since the terminal can determine the first target vector according to the first direction vector and the first normal vector and the first target vector is configured to instruct the terminal to search for the signal transmitted by the target base station in the direction of the first target vector, then, when the terminal accesses the target base station, the terminal does not need to traverse multiple directions in the space where the terminal is located to search for the signal transmitted by the target base station. Instead, the terminal only needs to search for the signal transmitted by the target base station in the direction of the first target vector instructed by the first target vector, which shortens the time for the terminal to search for signals transmitted by the target base station in multiple directions, thereby saving time of process in which the terminal accesses the target base station and then improving the efficiency of the terminal accessing the target base station.

It should be understood that in this embodiment of the present disclosure, the radio frequency system 101 may be configured to receive and send signals in an information reception or transmission or call process. Specifically, after receiving downlink data from a base station, the radio frequency system 101 transmits the downlink data to the processor 110 for processing. In addition, the radio frequency system 101 transmits uplink data to the base station. Generally, the radio frequency system 101 includes but is not limited to an antenna, at least one amplifier, a transceiver, a coupler, a low noise amplifier, a duplexer, and the like. In addition, the radio frequency system 101 may further communicate with a network and another device by using a wireless communications system.

The terminal provides wireless broadband Internet access for a user by using the network module 102, for example, helps the user send and receive e-mails, browse web pages, and access streaming media.

The audio output unit 103 may convert audio data received by the radio frequency system 101 or the network module 102 or audio data stored in the memory 109 into an audio signal, and output the audio signal as a sound. In addition, the audio output unit 103 may further provide an audio output (for example, a call signal reception sound or a message reception sound) related to a specific function performed by the terminal 100. The audio output unit 103 includes a speaker, a buzzer, a phone receiver, and the like.

The input unit 104 is configured to receive an audio or video signal. The input unit 104 may include a graphics processing unit (Graphics Processing Unit, GPU) 1041 and a microphone 1042. The graphics processing unit 1041 processes a still image or image data of a video obtained by an image capture apparatus (for example, a camera) in a video capture mode or an image capture mode. A processed image frame may be displayed on the display unit 106. The image frame processed by the graphics processing unit 1041 may be stored in the memory 109 (or another storage medium), or transmitted by the radio frequency system 101 or the network module 102. The microphone 1042 may receive a sound, and can process the sound into audio data. The processed audio data may be converted in a phone call mode into a format that can be transmitted by the radio frequency system 101 to a mobile communications base station for outputting.

The terminal 100 further includes at least one sensor 105, for example, a light sensor, a motion sensor, and other sensors. Specifically, the light sensor includes an ambient light sensor and a proximity sensor, where the ambient light sensor may adjust luminance of a display panel 1061 based on brightness of ambient light, and the proximity sensor may turn off and/or backlight the display panel 1061 when the terminal 100 moves to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture of the terminal (such as switching between landscape and portrait, related games, and magnetometer posture calibration), implement vibration recognition related functions (such as a pedometer and stroke), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided for the user. The display unit 106 may include a display panel 1061. The display panel 1061 may be configured in a form of a liquid crystal display (Liquid Crystal Display, LCD), an organic light-emitting diode (Organic Light-Emitting Diode, OLED), or the like.

The user input unit 107 may be configured to receive input digit or character information, and generate a key signal input related to a user setting and function control of the terminal. Specifically, the user input unit 107 includes a touch panel 1071 and other input devices 1072. The touch panel 1071, also referred to as a touchscreen, may capture a touch operation of the user on or near the touch panel (for example, an operation performed by the user by using any appropriate object or accessory such as a finger or a stylus on the touch panel 1071 or near the touch panel 1071). The touch panel 1071 may include two parts: a touch detection apparatus and a touch controller. The touch detection apparatus detects a touch direction of the user, detects a signal generated by the touch operation, and transmits the signal to the touch controller. The touch controller receives touch signal from the touch detection apparatus, converts the touch signal into touch point coordinates, transmits the touch point coordinates to the processor 110, receives a command transmitted by the processor 110, and executes the command In addition, the touch panel 1071 may be a resistive touch panel, a capacitive touch panel, an infrared touch panel, or a surface acoustic wave touch panel. In addition to the touch panel 1071, the user input unit 107 may further include the other input devices 1072. Specifically, the other input devices 1072 may include but are not limited to a physical keyboard, a function key (such as a volume control key or a power-on/off key), a trackball, a mouse, a joystick, and the like. Details are not described herein.

Further, the touch panel 1071 may cover the display panel 1061. When the touch panel 1071 detects a touch operation on or near the touch panel, the touch panel 1071 transmits the touch operation to the processor 110 to determine a type of a touch event. Then the processor 110 provides a corresponding visual output on the display panel 1061 based on the type of the touch event. Although the touch panel 1071 and the display panel 1061 are used as two independent components to implement input and output functions of the mobile terminal in FIG. 8, the touch panel 1071 and the display panel 1061 may be integrated to implement the input and output functions of the terminal in some embodiments. This is not specifically limited herein.

The interface unit 108 is an interface for connecting an external apparatus to the terminal 100. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 108 may be configured to receive an input (for example, data information or power) from the external apparatus, and transmit the received input to one or more components in the terminal 100, or may be configured to transmit data between the terminal and the external apparatus.

The memory 109 may be configured to store a software program and various types of data. The memory 109 may mainly include a program storage area and a data storage area. The program storage area may store an operating system, an application program required by at least one function (such as an audio playing function or an image playing function), or the like. The data storage area may store data (such as audio data or a phone book) that is created based on usage of the mobile phone, or the like. In addition, the memory 109 may include a high-speed random access memory, and may further include a non-volatile memory, for example, at least one magnetic disk storage device, a flash memory, or another non-volatile solid-state storage device.

The processor 110 is a control center of the terminal. The processor 110 uses various interfaces and lines to connect all parts of the entire terminal, and executes various functions and data processing of the terminal by running or executing the software program and/or module stored in the memory 109 and invoking data stored in the memory 109, thereby performing overall monitoring on the terminal. The processor 110 may include one or more processing units. Optionally, the processor 110 may integrate an application processor and a modem processor. The application processor mainly processes the operating system, a user interface, an application program, and the like. The modem processor mainly processes wireless communication. It may be understood that alternatively, the modem processor may not be integrated with the processor 110.

The terminal 100 may further include the power supply 111 (such as a battery) supplying power to each component. Optionally, the power supply 111 may be logically connected to the processor 110 by using a power management system, so that functions such as charge and discharge management and power consumption management are implemented by using the power management system.

In addition, the terminal 100 includes some functional modules not shown, which will not be repeated here.

Optionally, one embodiment of the present disclosure further provides a terminal, including a processor 110, a memory 109, and a computer program that is stored in the memory 109 and can be run by the processor 110. When the computer program is executed by the processor 110, each process of the foregoing method embodiment is implemented, and a same technical effect can be achieved. Details are not described again herein to avoid repetition.

One embodiment of the present disclosure further provides a computer-readable storage medium, where the computer-readable storage medium stores a computer program. When the computer program is executed by a processor, each process of the foregoing method embodiment is implemented, and a same technical effect can be achieved. Details are not described again herein to avoid repetition. The computer-readable storage medium may be, for example, a read-only memory (Read-Only Memory, ROM), a random access memory (Random Access Memory, RAM), a magnetic disk, or an optical disc.

It is to be understood that the terms such as "include" and "comprises" or their variations used in the specification are intended to encompass a non-exclusive inclusion, such that a process, method, article or device that include a series of elements include not only those elements but also other elements that are not explicitly listed, or elements that are inherent to such process, method, article, or device. Without more restrictions, an element defined by the sentence "including a . . . " does not exclude existence of other identical element in the process, method, article or device that includes the element.

Through the description of the above embodiments, those skilled in the art can clearly understand that the foregoing embodiment method can be implemented by means of software plus a necessary general hardware platform, and, can also be through hardware, but in many cases, the former is better. Based on such understanding, the technical solution of the present disclosure essentially or the part that contributes to the prior art may be embodied in the form of a software product. A computer software product is stored in a storage medium (such as ROM/RAM, magnetic disk, optical disk), including several instructions to enable a terminal (which may be a mobile phone, a computer, a server, an air conditioner, or a network device, etc.) to execute the method described in each embodiment of the present disclosure.

The embodiments of the present disclosure have been described above with reference to the drawings, but the present disclosure is not limited to the foregoing specific embodiments. The foregoing specific embodiments are merely illustrative and not restrictive. In the light of the present disclosure, those skilled in the art may make many variations without departing from the sprit and the protection scope of the claims, which fall within the protection of the present disclosure.

What is claimed is:

1. A terminal detection method, comprising:
 obtaining current first position information of a terminal; wherein the first position information is configured to indicate that a position where the terminal is currently located is a first position;
 when the first position information does not match second position information stored in the terminal, obtaining a first direction vector; wherein the first direction vector is a direction vector between a target base station and the terminal, and the target base station is a base station to be accessed by the terminal;
 obtaining a current first normal vector of an antenna array plane of the terminal;
 determining a first target vector according to the first direction vector and the first normal vector; wherein the first target vector is configured to instruct the terminal to search for a signal transmitted by the target base station in a direction of the first target vector;
 wherein the determining a first target vector according to the first direction vector and the first normal vector, comprises:
 calculating a difference between the first direction vector and the first normal vector to obtain the first target vector.

2. The method according to claim 1, wherein the method further comprises:
 when the first position information matches the second position information, obtaining a second normal vector and a second target vector corresponding to the second position information according to a list, containing correspondence among the second position information, the second normal vector and the second target vector, stored by the terminal;
 obtaining a current first normal vector of the antenna array plane of the terminal;
 determining a third target vector according to the first normal vector, the second normal vector and the second target vector; wherein the third target vector is configured to instruct the terminal to search for the signal transmitted by the target base station in a direction of the third target vector.

3. The method according to claim 2, wherein the determining a third target vector according to the first normal vector, the second normal vector and the second target vector, comprises:
 calculating a difference between the first normal vector and the second normal vector to obtain a first vector;
 calculating a sum of the first vector and the second target vector to obtain the third target vector.

4. The method according to claim 2, wherein the obtaining a current first normal vector of the antenna array plane of the terminal, comprises:
 obtaining a current rotation angle of the terminal; wherein the rotation angle is an angle at which an axis of the terminal rotates relative to an initial normal vector of the antenna array plane of the terminal, and a direction of the axis is the same as a direction of the initial normal vector before the axis is rotated;
 obtaining the first normal vector according to the rotation angle and the initial normal vector.

5. The method according to claim 1, wherein the obtaining a current first normal vector of the antenna array plane of the terminal, comprises:
 obtaining a current rotation angle of the terminal; wherein the rotation angle is an angle at which an axis of the terminal rotates relative to an initial normal vector of the antenna array plane of the terminal, and a direction of the axis is the same as a direction of the initial normal vector before the axis is rotated;
 obtaining the first normal vector according to the rotation angle and the initial normal vector.

6. The method according to claim 1, wherein after the determining a first target vector according to the first direction vector and the first normal vector, the method further comprises:
adjusting a beam direction of an antenna array of the terminal to be the same as the direction of the first target vector.

7. The method according to claim 6, wherein after the adjusting a beam direction of an antenna array of the terminal to be the same as the direction of the first target vector, the method further comprises:
searching for the signal transmitted by the target base station in the direction of the first target vector;
when the signal is searched, transmitting a request message for establishing connection to the target base station.

8. A terminal, comprising: a processor, a memory, and a computer program stored on the memory and operable on the processor; wherein the computer program is executed by the processor to:
obtain current first position information of the terminal, wherein the first position information is configured to indicate that a position where the terminal is currently located is a first position;
when the first position information does not match second position information stored in the terminal, obtain a first direction vector, wherein the first direction vector is a direction vector between a target base station and the terminal, and the target base station is a base station to be accessed by the terminal;
obtain a current first normal vector of an antenna array plane of the terminal;
determine a first target vector according to the first direction vector and the first normal vector obtained by the obtaining unit, wherein the first target vector is configured to instruct the terminal to search for a signal transmitted by the target base station in a direction of the first target vector;
wherein the processor is further configured to,
calculate a difference between the first direction vector and the first normal vector to obtain the first target vector.

9. The terminal according to claim 8, wherein the processor is further configured to, when the first position information matches the second position information, obtain a second normal vector and a second target vector corresponding to the second position information according to a list, containing correspondence among the second position information, the second normal vector and the second target vector, stored by the terminal;
obtain a current first normal vector of the antenna array plane of the terminal;
determine a third target vector according to the first normal vector, the second normal vector and the second target vector; wherein the third target vector is configured to instruct the terminal to search for the signal transmitted by the target base station in a direction of the third target vector.

10. The terminal according to claim 9, wherein the processor is further configured to,
calculate a difference between the first normal vector and the second normal vector to obtain a first vector;
calculate a sum of the first vector and the second target vector to obtain the third target vector.

11. The terminal according to claim 9, wherein the processor is further configured to,
obtain a current rotation angle of the terminal; wherein the rotation angle is an angle at which an axis of the terminal rotates relative to an initial normal vector of the antenna array plane of the terminal, and a direction of the axis is the same as a direction of the initial normal vector before the axis is rotated;
obtain the first normal vector according to the rotation angle and the initial normal vector.

12. The terminal according to claim 8, wherein the processor is further configured to,
obtain a current rotation angle of the terminal; wherein the rotation angle is an angle at which an axis of the terminal rotates relative to an initial normal vector of the antenna array plane of the terminal, and a direction of the axis is the same as a direction of the initial normal vector before the axis is rotated;
obtain the first normal vector according to the rotation angle and the initial normal vector.

13. The terminal according to claim 8, wherein the processor is further configured to,
after the determining unit determines the first target vector according to the first direction vector and the first normal vector, adjust a beam direction of an antenna array of the terminal to be the same as the direction of the first target vector.

14. The terminal according to claim 13, wherein the processor is further configured to,
after the adjusting unit adjusts the beam direction of the antenna array of the terminal to be the same as the direction of the first target vector, search for the signal transmitted by the target base station in the direction of the first target vector;
when the signal is searched, transmit a request message for establishing connection to the target base station.

* * * * *